United States Patent
Duggan et al.

(10) Patent No.: US 12,265,946 B2
(45) Date of Patent: Apr. 1, 2025

(54) RISK ASSESSMENT BASED ON AUGMENTED SOFTWARE BILL OF MATERIALS

(71) Applicant: BlackBerry Limited, Waterloo (CA)

(72) Inventors: Neil David Jonathan Duggan, Basingstoke (GB); Adam John Boulton, Wirral (GB)

(73) Assignee: BlackBerry Limited, Waterloo (CA)

(*) Notice: Subject to any disclaimer, the term of this patent is extended or adjusted under 35 U.S.C. 154(b) by 233 days.

(21) Appl. No.: 17/736,428

(22) Filed: May 4, 2022

(65) Prior Publication Data

US 2023/0359992 A1 Nov. 9, 2023

(51) Int. Cl.
G06Q 10/0875 (2023.01)
G06Q 10/0635 (2023.01)
G06Q 10/0637 (2023.01)

(52) U.S. Cl.
CPC ..... *G06Q 10/0875* (2013.01); *G06Q 10/0635* (2013.01); *G06Q 10/0637* (2013.01)

(58) Field of Classification Search
CPC ....... G06F 21/577; G06F 8/65; G06F 21/6227
USPC .......................................................... 726/25
See application file for complete search history.

(56) References Cited

U.S. PATENT DOCUMENTS

| | | |
|---|---|---|
| 9,465,942 B1 | 10/2016 | Kane Parry et al. |
| 2015/0268948 A1 | 9/2015 | Plate |
| 2017/0180346 A1 | 6/2017 | Saurez et al. |
| 2018/0239898 A1 | 8/2018 | Haerterich et al. |
| 2019/0050576 A1* | 2/2019 | Boulton ................. G06F 21/577 |
| 2019/0220596 A1 | 7/2019 | Lie et al. |
| 2019/0227902 A1 | 7/2019 | Cheng et al. |
| 2019/0251251 A1 | 8/2019 | Carson |
| 2020/0167476 A1 | 5/2020 | Boulton |
| 2020/0201620 A1 | 6/2020 | Beard |
| 2021/0029151 A1* | 1/2021 | Brooks ................. H04L 9/3218 |
| 2022/0083652 A1 | 3/2022 | Ransford et al. |
| 2022/0337611 A1* | 10/2022 | Brazao ....................... H04L 9/50 |
| 2023/0367883 A1* | 11/2023 | Bussell ................. G06F 21/577 |

FOREIGN PATENT DOCUMENTS

| | | |
|---|---|---|
| EP | 1376343 | 1/2004 |
| EP | 3716113 | 9/2020 |
| WO | WO 2021231423 | 11/2021 |

OTHER PUBLICATIONS

Extended European Search Report in European Appln. No. 23164627.4, mailed on Sep. 20, 2023, 6 pages.
Extended European Search Report in European Appln. No. 23164625.8, mailed on Sep. 15, 2023, 6 pages.

(Continued)

*Primary Examiner* — Jacob Lipman
(74) *Attorney, Agent, or Firm* — Fish & Richardson P.C.

(57) ABSTRACT

Systems, methods, and software can be used to identify security risks in software code based on Software Bill of Materials (SBOM). In some aspects, a method includes: obtaining, by a server, software code and a SBOM corresponding to the software code; identifying, by the server and based on the SBOM, a library used by the software code; and generating, by the server, a risk assessment based on at least one metric corresponding to the library, where the at least one metric is associated with one or more maintainers of the library.

17 Claims, 3 Drawing Sheets

(56) References Cited

OTHER PUBLICATIONS

U.S. Appl. No. 17/736,433, filed May 4, 2022, Duggan et al.
Grammatech.com [online], "CodeSentry—Software Supply Chain Security Platform" Oct. 2020, [retrieved on Jul. 5, 2022], retrieved from : URL <https://www.grammatech.com/codesentry-sca>, 8 pages.
ISO/SAE "Road Vehicles—Cybersecurity Engineering" Final Draft, International Standard, ISO/SAE FDIS 21434, May 2021, 92 pages.
The United States Department of Commerce, "The Minimum Elements For a Software Bill of Materials (SBOM)" Pursuant to Executive Order 14028 on Improving the Nation's Cybersecurity, Jul. 12, 2021, 28 pages.
Whitehouse.gov [online], "Executive Order on Improving the Nation's Cybersecurity" May 12, 2021. [retrieved on Jul. 5, 2022], retrieved from : URL <https://www.whitehouse.gov/briefing-room/presidential-actions/2021/05/12/executive-order-on-improving-the-nations-cybersecurity/>, 19 pages.
Wikipedia.org [online], "Evaluation Assurance Level" created on Sep. 2004, [retrieved on Jul. 5, 2022], retrieved from : URL <https://en.wikipedia.org/wiki/Evaluation_Assurance_Level>, 6 pages.
Non-Final Office Action in U.S. Appl. No. 17/736,433, mailed on Jun. 27, 2024, 12 pages.
Final Office Action in U.S. Appl. No. 17/736,420, mailed on Jul. 5, 2024, 34 pages.
Final Office Action in U.S. Appl. No. 17/736,433, mailed on Sep. 25, 2024, 9 pages.
Non-Final Office Action in U.S. Appl. No. 17/736,433, mailed on Jul. 15, 2024, 10 pages.

\* cited by examiner

RISK ASSESSMENT BASED ON AUGMENTED SOFTWARE BILL OF MATERIALS

TECHNICAL FIELD

The present disclosure relates to identifying security risks in software code based on Software Bill of Materials.

BACKGROUND

In some cases, software services can be provided by software code. The software code can be created by assembling software components, including open source and/or commercial software components. Software Bill of Materials (SBOM) can be used to describe the software components of the software code. For example, the SBOM can include a list of the software components used to create the software code and metadata associated with each software component.

DESCRIPTION OF DRAWINGS

Like reference numbers and designations in the various drawings indicate like elements.

DETAILED DESCRIPTION

In some cases, software code can include security risks resulting from software supply chain attacks. In software supply chain attacks, the producer of the software code may not have been hacked and may appear non-vulnerable, but the tools or libraries used by the producer to produce the software code may have been compromised. Examples of software supply chain attacks include SolarWinds, watering hole attacks, software backdoors, etc. In some cases, the software code's compliance with a particular software development standard can be an indication that the software code is of high quality and does not suffer from any software supply chain attack.

The software development standard can fall into one of two categories, namely goal/process based and prescriptive. A goal/process based standard describes the desired outcome of software code (e.g., the reliability of the software code is high). Goal/process based standards can stay relevant as they encourage particular processes and describe desired outcomes in more abstract ways. However, it can be difficult to identify the particular procedures that were performed on the software code to achieve the software development standard. In contrast, a prescriptive standard describes the processes, activities, or tests required by the software development standard for a software code (e.g., the code complexity of the software code needs to be lower than a particular threshold). Because the prescriptive standards describe technical measures, they can quickly become dated.

Whether goal/process based or prescriptive, the problem is that it is very difficult and time consuming for an integrator/consumer of software code to establish the adherence of the software code to a particular software development standard or be provided with a detailed list of processes and activities that were carried out to achieve the particular software development standard. Often the integrator/consumer will have to contact the software supplier and request artefacts that support the supplier's claim. This can be both inefficient and error prone for both the supplier and the integrator/consumer.

Figure 1:
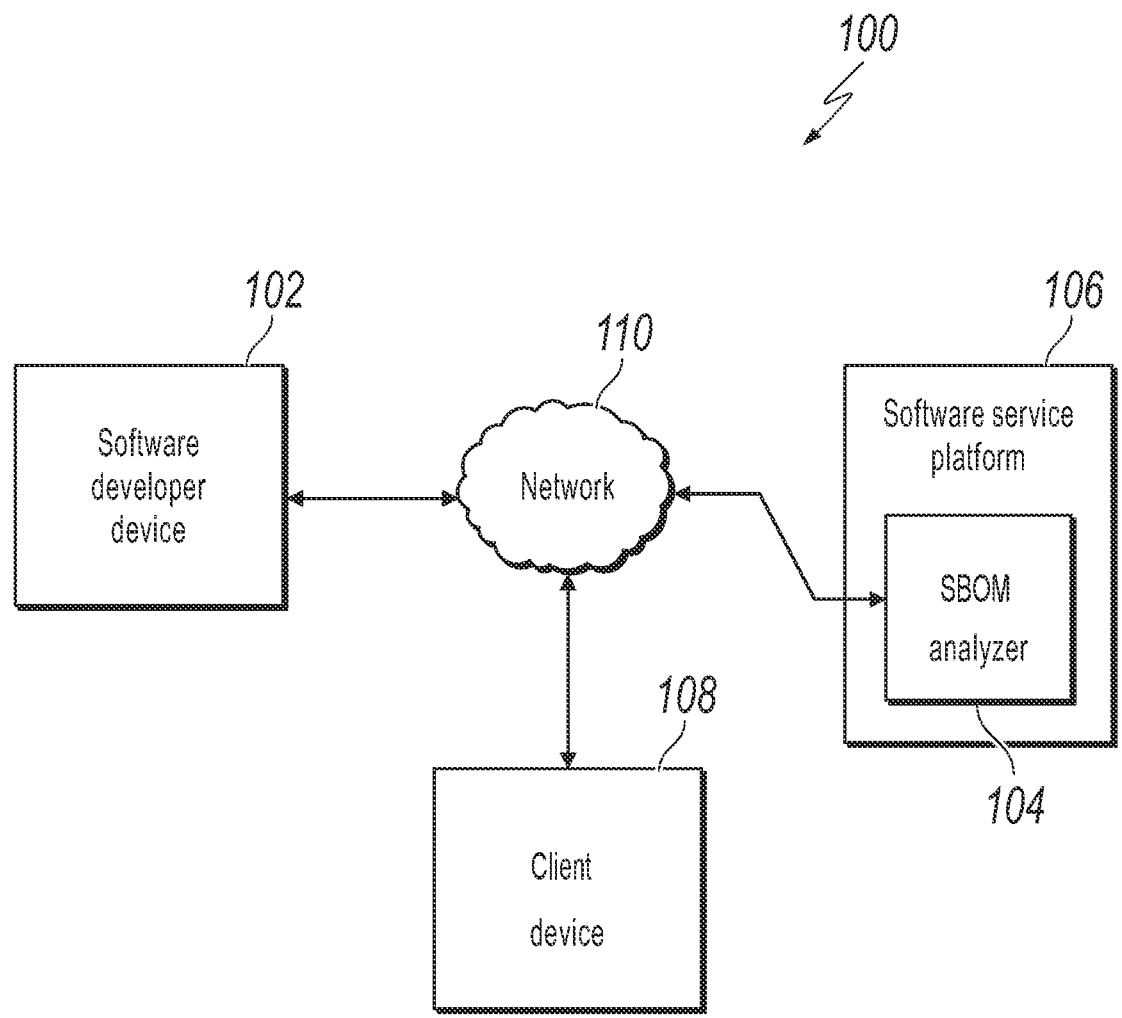
FIG. 1 is a schematic diagram showing an example communication system that identifies security risks in software code based on Software Bill of Materials (SBOM), according to an implementation.
Figure 2:
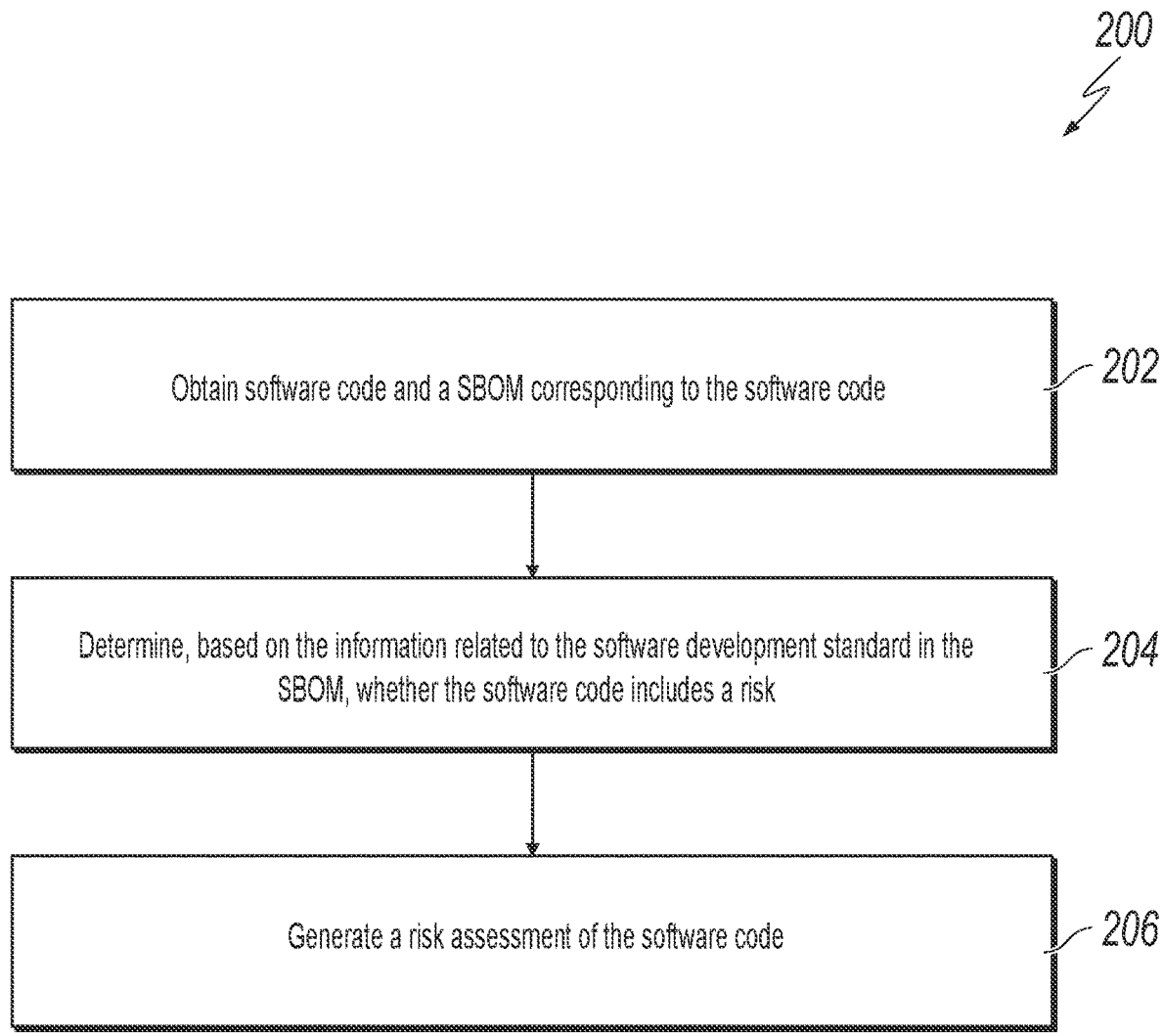
FIG. 2 is a flowchart showing an example method for identifying security risks in software code based on SBOM, according to an implementation.
Figure 3:
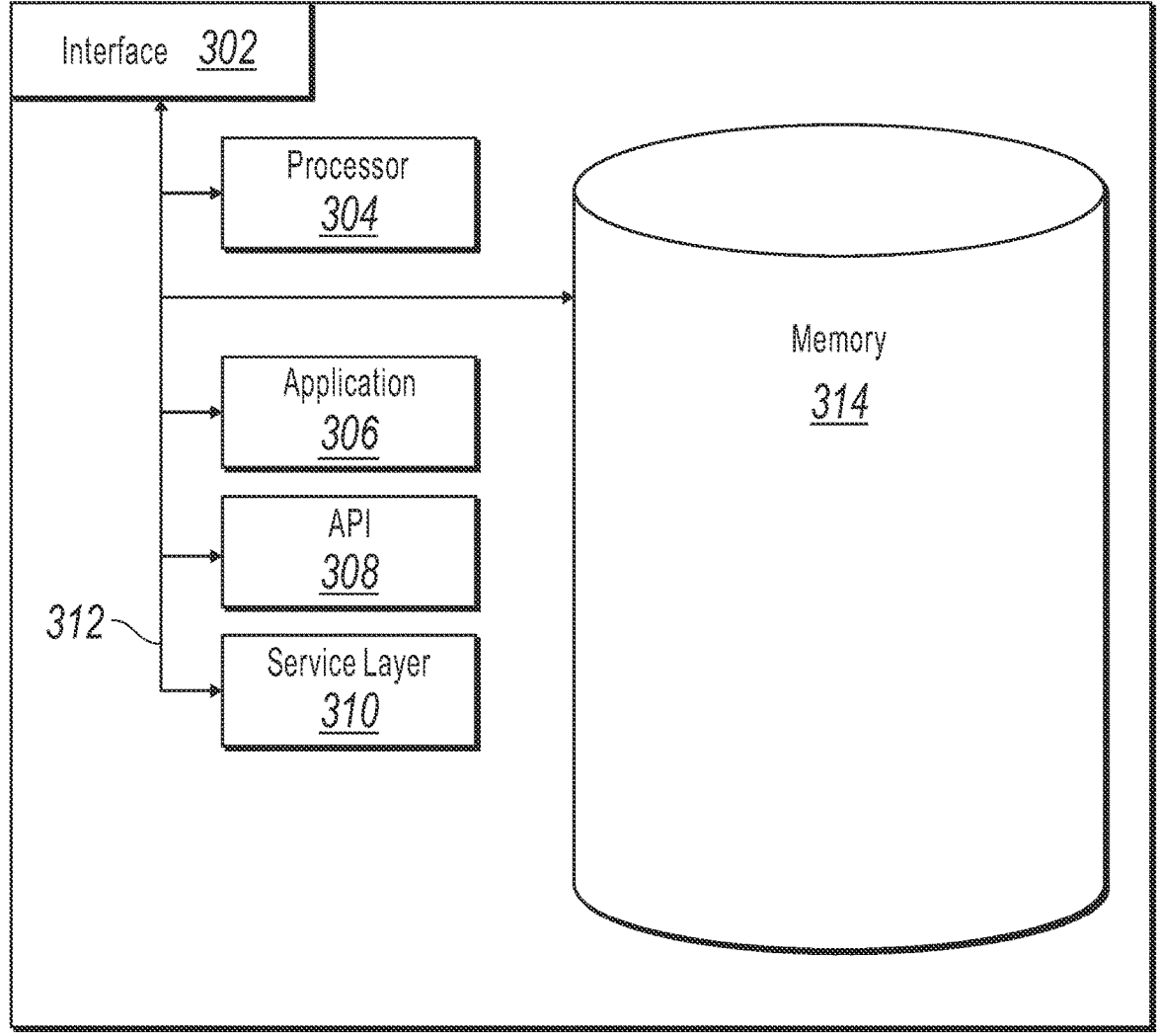
FIG. 3 is a high-level architecture block diagram of a computer according to an implementation.

In some embodiments, a SBOM can be augmented with standards, processes, and/or activities information beyond those anticipated base features of a SBOM. The standards, processes, and activities information included in the SBOM can be read to flag version, vulnerabilities, and licensing issues with the software components of software code. For example, the SBOM can state that the software code complies with a particular software development standard. If the particular software development standard mandates that a development process is followed but the declaration of the development process is missing from the SBOM or is incorrect in the SBOM, then the software code can be determined to include a security risk. FIGS. 1-3 and associated descriptions provide additional details of these implementations.

Techniques described herein produce one or more technical effects. In some cases, the techniques can enhance security of the software code by identifying security risks in the software code. For one example, the techniques can identify security risks resulting from software supply chain attacks. In software supply chain attacks, the producer of the software code may not have been hacked and may appear non-vulnerable, but the tools or libraries used by the producer to produce the software code may have been compromised. The techniques can add to the SBOM standards, processes, and/or activities information that can be used to analyze whether the software code complies with a particular software development standard. In this way, the techniques can detect software supply chain attacks occuring to one or more software components used by the software code, and thus can enhance security of the software code. Further, the techniques can leverage standards, processes, and/or activities information in addition to other basic information (e.g., simple vulnerability levels of software components) documented in the SBOM to produce a more accurate result of the security risks of the software code. As well as detecting deliberate software supply chain attacks, the techniques also lend themselves to detecting cases where software code has not been deliberately compromised but is still vulnerable. For example, the techniques can detect that software code does not comply with a security standard and is likely to be vulnerable. In some cases, the techniques can improve efficiencies of detecting security risks in software code. For example, contrary to the inefficient manner of contacting the supplier and requesting artefacts that support the supplier's claim, the techniques allow the consumer/integrator to automatically validate adherence to external software development standards and internal processes using information included in the SBOM.

FIG. 1 is a schematic diagram showing an example communication system 100 that provides data communications for identifying security risks in software code based on SBOM, according to an implementation. At a high level, the example communication system 100 includes a software developer device 102 that is communicatively coupled with a software service platform 106 and a client device 108 over a network 110. In some cases, the software developer device 102 can be part of a software developer environment that includes multiple devices, servers, and cloud computing platforms.

The software developer device 102 represents an application, a set of applications, software, software modules, hardware, or any combination thereof, that can be configured to submit the software code to the software service platform 106. In some cases, the software developer device 102 and the software service platform 106 can be the same device. For example, the creation of the software code and the SBOM analyzer 104 can be implemented on the same device. The software code can be downloaded to the client device 108 to be executed on the client device 108. The software code can also be executed on the software service platform 106 to provide software service to the client device 108. Examples of the software services can include software as a service (SaaS) applications such as SALESFORCE, OFFICE 365, or other software application services.

The software service platform 106 includes a SBOM analyzer 104. The SBOM analyzer 104 represents an application, a set of applications, software, software modules, hardware, or any combination thereof, that is executed on the software service platform 106 to identify security risks in software code based on SBOM of the software code. In some implementations, the SBOM analyzer 104 can obtain software code and a SBOM corresponding to the software code, where the SBOM includes information related to a software development standard, determine, based on the information related to the software development standard in the SBOM, whether the software code includes a risk, and based on determining whether the software code includes a risk, generate a risk assessment of the software code. FIGS. 2-3 and associated descriptions provide additional details of these implementations.

The software service platform 106 can be implemented using one or more computers, computer servers, or a cloud-computing platform.

The client device 108 represents an electronic device that accesses a software service provided by the software provider. In some cases, a browser or a client application can be executed on the client device 108 to communicate service requests and service responses with the software service platform of the software provider to obtain software services.

Turning to a general description, the client device 108 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or combination thereof, that can be configured to transmit data messages between the entities in the example communication system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flowchart showing an example method 200 for identifying security risks in software code based on SBOM, according to an implementation. The example method 200 can be implemented by a server, e.g., the software service platform 106 shown in FIG. 1. The example method 200 shown in FIG. 2 can be implemented using additional, fewer, or different operations, which can be performed in the order shown or in a different order.

The method 200 starts at step 202 with obtaining software code and a SBOM corresponding to the software code, where the SBOM includes information related to a software development standard. In some cases, the server can obtain the software code from at least one of a software developer device (e.g., the software developer device 102) or a software provider. Likewise, the server can obtain the SBOM from at least one of a software developer device (e.g., the software developer device 102) or a software provider. The server can obtain the software code and the SBOM together or separately. The software code can include at least one of source code or binary software code.

In a software development process, source code can be created by programmers using a text editor or visual programming tool prior to compilation. The source code can be developed with a human-readable programming language, and may be saved in a text file. The source code can be transformed by an assembler or a compiler into binary software code that can be executed by the computer.

The binary software code can include a stream of bytes that are generated by compiling the source code. Thus, the binary software may not be in a human-readable format and may not be easily parsed or analyzed by a human.

The binary software code can be in a configuration of object code, executable code, or bytecode. An object code is the product of compiler output of a sequence of statements or instructions in a computer language. The source code can be logically divided into multiple source files. Each source file is compiled independently into a corresponding object file that includes object code. The object codes in the object files are binary machine codes, but they may not be ready to be executed. The object files can include incomplete references to subroutines outside itself and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

A SBOM is a nested inventory of its corresponding software code. The SBOM can include a list of the open source and/or closed source components present in the software code. The SBOM can be associated with a particular software component or set of components, an individual file, or even a snippet of code. The SBOM can be in multiple file formats, including, but not limited to, PDF, .xlsx, .spdx, .xml, .json, and .yaml.

In some cases, the SBOM can include one or more of library information, document creation information, package information, file information, snippet information, licensing information, relationship information, and annotations. The library information can include a list of open software libraries and/or closed software libraries used by the software code. For each library, the library information can also include a corresponding vulnerability level indicating whether the library is vulnerable. The document creation information can provide the necessary information for forward and backward compatibility for processing tools, such as version numbers, license for data, authors, etc. The package information can be used to describe a product, container, component, packaged upstream project sources, contents of a tarball, etc. The file information can include a file's important metadata, including its name, checksum licenses, copyright, etc. The snippet information can be used when a file is known to have some content that has been included from another original source. The snippet information can be useful for denoting when part of a file may have been originally created under another license. Licensing information can include a list of licenses that may be present in the software code. Relationships information can describe the ways that SBOM, packages, and files are related to each other. Annotations can include additional information that a reviewer of the SBOM wants to include in the SBOM.

In some examples, the information in the SBOM can include information related to a development process specified in a software development standard. For one example, the software development standard can be ISO 21434 "Road vehicles—Cybersecurity engineering," and the development process can be mandatory practice or process in place and adhered to whilst developing the software code, for instance in performing threat analysis and for integration and verification activities. For another example, the software development standard can be the President's Executive Order (EO) on "Improving the Nation's Cybersecurity (14028)," and the development process can be process or activity carried out whilst developing the software code, for instance attesting to secure software development practises and checking for known and potential vulnerabilities and remediating them. In some cases, the SBOM can include at least one of external standard(s) that the software code is adhered to, list of internal processes and versions followed, or list of relevant activities and results. The development process can include at least one of a secure software development process, a static application security testing process, a security design assessment, or a static analysis test.

In some examples, the software development standard can be a standard for automotive cybersecurity (e.g., ISO 21434), and the information in the SBOM can include a Cybersecurity Assurance Level (CAL) rating associated with the software code. Annex E of standard ISO 21434 defines CAL. The CAL determines the amount of rigour that should be applied in developing a component to the appropriate assurance level. CAL is based on a scale of 1 to 4. A CAL rating is assigned on a component partly based on the component's context, for example, the type of the component and the component's characteristics. For example, a braking electronic control unit (ECU) firmware image with network-based behaviour (e.g., Controller Area Network (CAN)) can have a CAL 4 level. In additon, the CAL rating can be determined based on, for example, the chipset architecture, presence of any application frameworks (e.g., classic AutoSAR), presence of particular functionality (e.g., CAN bus behaviours), etc.

A JSON snippet is shown below to illustrate an example of how the information could be structured and conveyed in the SBOM:

```
{"Standards-processes-results ": {
    "external-standards":
    {
        "name": "External standard name",
        "version": "2.0"
        "url":"www.externalstandard.com/nameofspec.pdf"
    },
    "internal-processes": [
    {
        "name": "Secure Software Development Process",
        "version": "2.1"
        "url":"www.supplier.com/processes/secure-software-development.pdf"
    },
    {
        "name": "Static Application Security Testing Process",
        "version": "3.2"
        "url": www.supplier.com/processes/static-testing"
    }
    ]
    "results": [
    {
        "name": "Security Design Assessment",
        "version": "1.2"
        "url":" www.supplier.com/results/security-design-assessment"
    },
    {
        "name": "Static analysis test results",
        "version": "1.2"
        "url":"www.supplier.com/results/static-test-results"
    },
    {
        "name": "Threat model",
        "version": "2.0"
        "url":" www.supplier.com/results/threat-model"
    }]
    }
}
```

In some embodiments, a sender of the SBOM (e.g., the software developer device 102) can include some or all of the above-described information in the SBOM before sending it to other device(s).

At step 204, the method 200 determines, based on the information related to the software development standard in the SBOM, whether the software code includes a risk. In some cases, the server can read the information related to the software development standard, such as the standards, processes, and activities metadata. The server can then feed the information into its SBOM validation routines. For example, if a software development standard mandates that a development process is followed and the declaration of the development process is missing from the SBOM or the information related to the development process is incorrect or incomplete in the SBOM, then the SBOM can fail the validation routines and the server can determine that the software code includes a risk. For another example, the server can retrieve actual test result data. This allows the SBOM validation routines to support deeper checks, for example, highlighting if there are an unacceptably high number of remaining issues from a static analysis test. If the number of remaining issues exceeds a predetermined threshold, the server can determine that the software code includes a risk. In some cases, when the server identifies a software development standard declared in the SBOM, the server can trigger one or more tests related to the software development standard to verify that the software code complies with the software development standard.

In some cases, a component in the software code can include a plurality of subcomponents that are parts or members of the component. The information in the SBOM can include a CAL rating of each of the plurality of subcomponents. The server can then determine a CAL rating of the component based on the CAL ratings of the plurality of subcomponents. In a first example method, the server can use the lowest CAL rating of the the plurality of subcomponents as the CAL rating of the component. In a second example method, each subcomponent can be classified in a category and each category can be assigned a weight. The CAL rating of the component can be a weighted sum $CAL_{component} = \Sigma_i CAL_{i\_average} \times W_i$, where $CAL_{i\_average}$ is the average CAL rating of subcomponet(s) of category i, and $W_i$ is the weight of category i. In a third example method, the CAL rating of the component can be the lowest CAL rating of the subcomponents of a category that has the highest weight among all categories.

For example, assuming that a component has subcomponents A, B, and C, whose CAL ratings are 3, 2, and 1, respectively. Subcomponent A and B belong to category M which has a weight of 0.6, and subcomponent C belongs to category N which has a weight of 0.4. Using the first example method described above, the CAL rating of the component is 1, i.e., the lowest CAL rating of the subcomponents A, B, and C. Using the second example method described above, the CAL rating of the component is $CAL_{component} = [(3+2)/2] \times 0.6 + 1 \times 0.4 = 1.9$. In some cases, the weighted sum can be rounded to its closest integer to determine an integral CAL rating of the component, so in this example the CAL rating of the component can be 2. Using the third example method described above, subcomponents A and B are in the category that has the highest weight 0.6, and subcomponent B has the lowest CAL rating in this category. The CAL rating of the component can then be 2, i.e., the same as the CAL rating of subcomponent B.

In some examples, the server can determine, based on the CAL rating of a component of the software code, whether to initiate an analysis (e.g., a code analysis) on the software code to determine whether the software code includes a risk. For one example, if the CAL rating of a component is lower than a predetermined threshold, the component is potentially vulnerable and the server can determine that the software code includes a risk and/or initiate an analysis on the software code corresponding to the component. For another example, if the CAL rating of a component is higher than a predetermined threshold, the component can be a critical component which requires a high degree of assurance. In such case, the server can initiate an analysis on the software code corresponding to the component to ensure that the component is not vulnerable.

In some cases, the SBOM can include a CAL rating of a component and the rationale for the rating assignment. The server can determine whether the rationale supports the CAL rating. If the rationale does not support the CAL rating, the server can determine that the software code includes a risk.

In some implementations, the code analysis can include scanning software code to identify at least one of a network addresses, a hardcoded user credential, or a library call that is indicative of a potential backdoor. The server can include the identified potential backdoor in the risk assessment. The software code can be at least one of source code or binary software code.

In some examples, the server can scan the software code to identify one or more text strings. In some implementations, text strings are encoded in binary software codes using one or more encoding protocols. Examples of the encoding protocols include the American Standard Code for Information Interchange (ASCII) encoding protocol or the Unicode protocol. A text string includes one or more consecutive text characters. Examples of the text characters include alphabetic letter, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0×61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the software codes, these text characters form a text string. In some cases, the scanning can be performed from the beginning of the software code (forward scanning), from the end of the software code (backward scanning), or from both the beginning and the end of the software code (parallel scanning).

In some cases, the identified text strings that are encoded in the software code can be used to determine one or more network addresses that are potential backdoors at which the software code may perform a network communication. For example, the text strings can include an email address or a URL. These text strings can be identified based on a specific character or a specific character string. For example, an email address can be identified by the "@" character in the text string. A URL can be identified by the "://," "HTTP," "HTTPS," or "FTP" characters in the text string. If such a specific character or character string is found in the text strings, the text strings can be parsed to determine a network address. For example, the portion of the text string after the specific character "@" can represent a network address of an email server. The portion of the text string after the specific character string "HTTPS" or "HTTP" can represent a network address of a web server. In one example, the portion of the text string that represents the network address can be in numerical form, e.g., an Internet Protocol (IP) v4 or v6 address. In another example, the portion of the text string that represents the network address can be in letter form, e.g., a Domain Name System (DNS) address that can be translated into an IP address by a DNS server.

In some implementations, the server can determine a configuration of the software code. The configuration of the software code can be object code, executable code, or bytecode. In some cases, the software developer can submit the software code in the configuration of object code. In these cases, the software code can be a collection of multiple object files that are compressed into one archive file, e.g., a zip file. Alternatively, the software developer can perform the link process and submit the executable file containing executable code. In some cases, e.g., if the software code was developed using JAVA, the software developer can submit the software code in a bytecode configuration. The server can determine the configuration based on the types of the file in which software code is submitted. For example, if the software code is submitted in a zip file, the server can determine that the software code is in an object code configuration. If the software code is submitted in an .exe file, the server can determine that the software code is in an executable code configuration. Alternatively or in combination, the server can determine the configuration by scanning the first few bytes of the software code. The first few bytes of the software code can be the header, which stores configuration information of the software code.

In some cases, based on the determined configuration, the server can further extract a segment of the software code that stores constant values used by the software code. For example, if the software code is in the object code configuration, the server can decompress the software code to obtain a collection of object files. The collection of object files can include a data segment, in some cases stored as a .data or a .h file, that stores constant values. Therefore, the server can locate the data segment by searching for .data or .h file in the collection of object files. In some cases, there can be more than one data segments in the software code.

If the software code was developed using JAVA, the software code may be in a bytecode configuration. In these cases, the configuration information in the header of the software code can indicate information of one or more constant tables that store constants used by the software code. The information can include locations of the constant tables and the numbers of entries in the constant tables. Based on the configuration information, the server can extract the constant tables from the software code.

If the server extracts data segments that include the constant values, the server can scan these data segments to identify network addresses used by the software code. Comparing to scanning the entire software code for network addresses, this approach simplifies the scanning process, and therefore saves time and computing resources. In some cases, e.g., the software code is submitted in an executable file and the software code was developed using native languages such as C, the server may not be able to extract these data segments. In these cases, the server can scan the entire software code to determine network addresses that are accessed by the software code.

In some implementations, in addition to, or as an alternative to, the scanning of the software code, the software code can be disassembled into assembly code. The assembly code can be parsed into different assembly instructions. The server can search the assembly instructions to determine network addresses that are accessed by the software code.

In some cases, the identified text strings that are encoded in the software code can be used to determine one or more hardcoded user credentials. For example, the text strings can include at least one of a hardcoded user name or a hardcoded password. The hardcoded user name or hardcoded password can be identified by identifying high entropy strings in the software code. A high entropy string can represent a string having high likelihood of being a secret. In some cases, the text string can be analyzed in relation to the function call that includes the text string to determine whether the text string includes hardcoded user credential. For example, if a text string is included in an API call indicative of authentication check, the text string may be identified as a hardcoded username or a hardcoded password. In some cases, the one or more hardcoded user credentials can be indicative of potential backdoors.

In some cases, the identified text strings that are encoded in the software code can be used to determine one or more library calls indicative of a potential backdoor. For example, a library call can be identified as a potential backdoor if the library call is used to open a port, execute a protocol of a predetermined list of protocols, call an API of a predetermined list of APIs, establish an out-of-band connection, call a network-exposed interface, bypass an authentication by hidden parameters, run a custom DNS query, enable a debug interface, or execute a function (e.g., runtime.exec( )) that allows arbitrary command by user controlled input.

In some cases, the server identifies a text string as a potential backdoor based on the context and use of the text string. The context of the text sting can be indicated by the text string itself, location of the text string, and/or the library call or function it is used in. For example, when a text string is identified as being used as hardcoded user credential in a library call, further analysis is performed to identify the function of the library call. A library call used to open a connection can be a potential backdoor, whereas a library call used to print documents may not be a potential backdoor. For another example, when a text string is identified as a high entropy string, further analysis can be performed to identify the use of the high entropy string. If the high entropy string is a parameter of a predetermined function call (e.g., an API call indicative of authentication check), the high entropy string can be a potential backdoor.

Example types of backdoor markers that the server seek in the software code include, but not limited to, open ports, out-of-band connections, hardcoded accounts, network exposed interfaces, authentication bypass by hidden parameters (this can be detected in the software code by password handling code), custom DNS queries, debug interfaces enabled, functions and code paths that allow arbitrary command execution by user controlled input (e.g., runtime.exec( ), or other attributes as appropriate.

In some cases, the server can generate a backdoor abstraction of the software code to include the potential backdoors discussed above. In some examples, the backdoor abstraction can be an Extensible Markup Language (XML) or a JavaScript Object Notation (JSON) file. An example backdoor abstraction of the software code in JSON is shown below:

```
{"Backdoor-markers":
    {
    "open-ports": [22, 80, 4444]
    "outbound-urls":    ["www.legitimate-url.com",    "www.legitimate-url.com",
    www.evil.com]
    "hard-coded-accounts": [
        {
        "username": "john",
        "password": "password"
        },
        {
        "username": "fred",
        "password": "password2"
        }
    ]
    }
}
```

At step 206, the method 200 generates a risk assessment of the software code based on determining whether the software code includes a risk. In some embodiments, the server can include in the risk assessment the one or more risks determined in step 204 and output the risk assessment. In some examples, the server can send the risk assessment to another device (e.g., the software developer device that submits the software code), or output the risk assessment in a user interface (UI) of the server. The risk assessment can then be further reviewed manually or by other computer-implemented review methods to confirm whether the risk listed in the risk assessment is a genuine vulnerability.

In some cases, a software code can have a high degree of confidence or assurance. For example, the server can determine that no risk is included in the software code or the one or more risk(s) included in the software code is not genuine vulnerability. When the software code has a high degree of confidence or assurance, the server can store, as a reliable baseline, the SBOM and/or its corresponding software code. When the server checks a later version of the software code for risks, the server can only check the relative difference in the later version of the software code against the reliable baseline. For example, when the reliable baseline is the SBOM of the software code, the server can obtain a SBOM of the later version of the software code, compare the SBOM of the later version of the software code with the reliable baseline to identify differences of the two SBOMs, and detect risk(s) in the differences of the two SBOMs.

FIG. 3 illustrates a high level architecture block diagram of a computer 300 according to an implementation. The computer 300 can be implemented as one of the software developer device 102, the software service platform 106, and the client device 108 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to identify security risks in software code based on SBOM. In some cases, the computer 300 may include a computing system implementing processes and methods disclosed in FIG. 2. In some cases, the processing algorithm of the code package establishment can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 110 from a web browser or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an API 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computer 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for identifying security risks in software code disclosed in FIG. 2.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: obtaining, by a server, software code and a Software Bill of Materials (SBOM) corresponding to the software code, wherein the SBOM comprises information related to a software development standard; determining, by the server and based on the information related to the software development standard in the SBOM, whether the software code comprises a risk; and based on determining whether the software code comprises a risk, generating, by the server, a risk assessment of the software code.

The foregoing and other described implementations can each, optionally, include one or more of the following features:

A first feature, combinable with any of the following features, wherein the information in the SBOM comprises information related to a development process specified in the software development standard, and wherein the method comprises: determining, by the server and based on the development process, that the software code comprises the risk.

A second feature, combinable with any of the following features, wherein determining, by the server and based on the development process, that the software code comprises the risk comprises: determining, by the server, that the information related to the development process is incomplete; and in response to determining that the information related to the development process is incomplete, determining that the software code comprises the risk.

A third feature, combinable with any of the following features, wherein the development process comprises at least one of a secure software development process, a static application security testing process, a security design assessment, or a static analysis test.

A fourth feature, combinable with any of the following features, wherein the software development standard is a standard for automotive cybersecurity, and the information in the SBOM comprises Cybersecurity Assurance Level (CAL) rating associated with the software code.

A fifth feature, combinable with any of the following features, wherein the software code comprises a component, the component comprising a plurality of subcomponents, and the information in the SBOM comprises a CAL rating of each of the plurality of subcomponents, and wherein the method comprises: determining, by the server, a CAL rating of the component based on the CAL rating of each of the plurality of subcomponents.

A sixth feature, combinable with any of the following features, comprising: determining, based on the CAL rating, whether to initiate an analysis on the software code to determine whether the software code comprises an additional risk.

In a second implementation, a computer-readable medium containing instructions which, when executed, cause a computing device to perform operations comprising: obtaining, by a server, software code and a Software Bill of Materials (SBOM) corresponding to the software code, wherein the SBOM comprises information related to a software development standard; determining, by the server and based on the information related to the software development standard in the SBOM, whether the software code comprises a risk; and based on determining whether the software code comprises a risk, generating, by the server, a risk assessment of the software code.

The foregoing and other described implementations can each, optionally, include one or more of the following features:

A first feature, combinable with any of the following features, wherein the information in the SBOM comprises information related to a development process specified in the software development standard, and wherein the operations comprise: determining, by the server and based on the development process, that the software code comprises the risk.

A second feature, combinable with any of the following features, wherein determining, by the server and based on the development process, that the software code comprises the risk comprises: determining, by the server, that the information related to the development process is incomplete; and in response to determining that the information related to the development process is incomplete, determining that the software code comprises the risk.

A third feature, combinable with any of the following features, wherein the development process comprises at least one of a secure software development process, a static application security testing process, a security design assessment, or a static analysis test.

A fourth feature, combinable with any of the following features, wherein the software development standard is a standard for automotive cybersecurity, and the information in the SBOM comprises Cybersecurity Assurance Level (CAL) rating associated with the software code.

A fifth feature, combinable with any of the following features, wherein the software code comprises a component, the component comprising a plurality of subcomponents, and the information in the SBOM comprises a CAL rating of each of the plurality of subcomponents, and wherein the operations comprise: determining, by the server, a CAL rating of the component based on the CAL rating of each of the plurality of subcomponents.

A sixth feature, combinable with any of the following features, the operations comprising: determining, based on the CAL rating, whether to initiate an analysis on the software code to determine whether the software code comprises an additional risk.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining, by a server, software code and a Software Bill of Materials (SBOM) corresponding to the software code, wherein the SBOM comprises information related to a software development standard; determining, by the server and based on the information related to the software development standard in the SBOM, whether the software code comprises a risk; and based on determining whether the software code comprises a risk, generating, by the server, a risk assessment of the software code.

The foregoing and other described implementations can each, optionally, include one or more of the following features:

A first feature, combinable with any of the following features, wherein the information in the SBOM comprises information related to a development process specified in the software development standard, and wherein the operations comprise: determining, by the server and based on the development process, that the software code comprises the risk.

A second feature, combinable with any of the following features, wherein determining, by the server and based on the development process, that the software code comprises the risk comprises: determining, by the server, that the information related to the development process is incomplete; and in response to determining that the information related to the development process is incomplete, determining that the software code comprises the risk.

A third feature, combinable with any of the following features, wherein the development process comprises at least one of a secure software development process, a static application security testing process, a security design assessment, or a static analysis test.

A fourth feature, combinable with any of the following features, wherein the software development standard is a standard for automotive cybersecurity, and the information in the SBOM comprises Cybersecurity Assurance Level (CAL) rating associated with the software code.

A fifth feature, combinable with any of the following features, wherein the software code comprises a component, the component comprising a plurality of subcomponents, and the information in the SBOM comprises a CAL rating of each of the plurality of subcomponents, and wherein the operations comprise: determining, by the server, a CAL rating of the component based on the CAL rating of each of the plurality of subcomponents.

A sixth feature, combinable with any of the following features, the operations comprising: determining, based on the CAL rating, whether to initiate an analysis on the software code to determine whether the software code comprises an additional risk.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
obtaining, by a server, software code and a Software Bill of Materials (SBOM) corresponding to the software code, wherein the SBOM comprises information related to a software development standard;
determining, by the server and based on the information related to the software development standard in the SBOM, whether the software code comprises a risk, wherein the software code comprises a component, the component comprises a plurality of subcomponents, and the information in the SBOM comprises a Cybersecurity Assurance Level (CAL) rating of each of the plurality of subcomponents, and wherein determining whether the software code comprises a risk comprises:

determining, by the server, a CAL rating of the component based on the CAL rating of each of the plurality of subcomponents; and based on determining whether the software code comprises a risk, generating, by the server, a risk assessment of the software code.

2. The method of claim 1, wherein the information in the SBOM comprises information related to a development process specified in the software development standard, and wherein the method comprises:

determining, by the server and based on the development process, that the software code comprises the risk.

3. The method of claim 2, wherein determining, by the server and based on the development process, that the software code comprises the risk comprises:

determining, by the server, that the information related to the development process is incomplete; and in response to determining that the information related to the development process is incomplete, determining that the software code comprises the risk.

4. The method of claim 2, wherein the development process comprises at least one of a secure software development process, a static application security testing process, a security design assessment, or a static analysis test.

5. The method of claim 1, wherein the software development standard is a standard for automotive cybersecurity.

6. The method of claim 1, comprising:

determining, based on the CAL rating, whether to initiate an analysis on the software code to determine whether the software code comprises an additional risk.

7. A computer-readable medium containing instructions which, when executed, cause a computing device to perform operations comprising:

obtaining, by a server, software code and a Software Bill of Materials (SBOM) corresponding to the software code, wherein the SBOM comprises information related to a software development standard;

determining, by the server and based on the information related to the software development standard in the SBOM, whether the software code comprises a risk, wherein the software code comprises a component, the component comprises a plurality of subcomponents, and the information in the SBOM comprises a Cybersecurity Assurance Level (CAL) rating of each of the plurality of subcomponents, and wherein determining whether the software code comprises a risk comprises:

determining, by the server, a CAL rating of the component based on the CAL rating of each of the plurality of subcomponents; and based on determining whether the software code comprises a risk, generating, by the server, a risk assessment of the software code.

8. The computer-readable medium of claim 7, wherein the information in the SBOM comprises information related to a development process specified in the software development standard, and wherein the operations comprise:

determining, by the server and based on the development process, that the software code comprises the risk.

9. The computer-readable medium of claim 8, wherein determining, by the server and based on the development process, that the software code comprises the risk comprises:

determining, by the server, that the information related to the development process is incomplete; and in response to determining that the information related to the development process is incomplete, determining that the software code comprises the risk.

10. The computer-readable medium of claim 8, wherein the development process comprises at least one of a secure software development process, a static application security testing process, a security design assessment, or a static analysis test.

11. The computer-readable medium of claim 7, wherein the software development standard is a standard for automotive cybersecurity.

12. The computer-readable medium of claim 7, the operations comprising:

determining, based on the CAL rating, whether to initiate an analysis on the software code to determine whether the software code comprises an additional risk.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a server, software code and a Software Bill of Materials (SBOM) corresponding to the software code, wherein the SBOM comprises information related to a software development standard;

determining, by the server and based on the information related to the software development standard in the SBOM, whether the software code comprises a risk, wherein the software code comprises a component, the component comprises a plurality of subcomponents, and the information in the SBOM comprises a Cybersecurity Assurance Level (CAL) rating of each of the plurality of subcomponents, and wherein determining whether the software code comprises a risk comprises:

determining, by the server, a CAL rating of the component based on the CAL rating of each of the plurality of subcomponents; and based on determining whether the software code comprises a risk, generating, by the server, a risk assessment of the software code.

14. The computer-implemented system of claim 13, wherein the software development standard is a standard for automotive cybersecurity.

15. The computer-implemented system of claim 13, wherein the information in the SBOM comprises information related to a development process specified in the software development standard, and wherein the operations comprise:

determining, by the server and based on the development process, that the software code comprises the risk.

16. The computer-implemented system of claim 15, wherein determining, by the server and based on the development process, that the software code comprises the risk comprises:

determining, by the server, that the information related to the development process is incomplete; and in response to determining that the information related to the development process is incomplete, determining that the software code comprises the risk.

17. The computer-implemented system of claim 15, wherein the development process comprises at least one of a secure software development process, a static application security testing process, a security design assessment, or a static analysis test.

* * * * *